(12) United States Patent
Sundström et al.

(10) Patent No.: US 11,980,837 B2
(45) Date of Patent: May 14, 2024

(54) ROTARY DRUM VACUUM FILTER WITH A THROTTLING VALVE

(71) Applicant: VALMET AB, Sundsvall (SE)

(72) Inventors: Åke Sundström, Timrå (SE); Jonas Magnusson, Sundsvall (SE); Anders Löfstrand, Sundsvall (SE); Peter Nykvist, Timrå (SE); Jörgen Lundberg, Uppsala (SE)

(73) Assignee: VALMET AB, Sundsvall (SE)

( * ) Notice: Subject to any disclaimer, the term of this patent is extended or adjusted under 35 U.S.C. 154(b) by 0 days.

(21) Appl. No.: 17/252,429

(22) PCT Filed: May 22, 2019

(86) PCT No.: PCT/SE2019/050468
§ 371 (c)(1),
(2) Date: Dec. 15, 2020

(87) PCT Pub. No.: WO2019/245422
PCT Pub. Date: Dec. 26, 2019

(65) Prior Publication Data
US 2021/0252436 A1    Aug. 19, 2021

(30) Foreign Application Priority Data

Jun. 21, 2018 (SE) .................................... 1850778-0

(51) Int. Cl.
*B01D 33/073* (2006.01)
*B01D 33/067* (2006.01)
(Continued)

(52) U.S. Cl.
CPC ......... *B01D 33/073* (2013.01); *B01D 33/067* (2013.01); *B01D 33/64* (2013.01); *B01D 33/82* (2013.01); *D21C 9/06* (2013.01)

(58) Field of Classification Search
None
See application file for complete search history.

(56) References Cited

U.S. PATENT DOCUMENTS

| 619,211 | A | * | 2/1899 | Nicholas | ................ | B01D 33/06 |
| | | | | | | 210/395 |
| 696,241 | A | * | 3/1902 | Johnson | ................ | B01D 33/06 |
| | | | | | | 210/392 |

(Continued)

FOREIGN PATENT DOCUMENTS

| CA | 3099289 A1 | * | 12/2019 | .......... | B01D 33/067 |
| WO | WO 93/00978 A1 | | 1/1993 | | |

(Continued)

OTHER PUBLICATIONS

Extended European Search Report, Application No. 19821796.0, dated Feb. 4, 2022, 6 pages.

(Continued)

*Primary Examiner* — Robert J Popovics
(74) *Attorney, Agent, or Firm* — Foley & Lardner LLP

(57) ABSTRACT

A pulp-filter arrangement (1) comprises a rotatable drum (10) and a non-rotating valve arrangement (30). The rotatable drum (10) has a cylindrical water-permeable pulp-supporting shell (14), a plurality of drain pipes (16) and a rotating hollow shaft (18). The plurality of drainpipes (16) connects the rotating hollow shaft (18) with a collecting channel (22) situated radially directly inside the cylindrical water-permeable pulp-supporting shell (14). The non-rotating valve arrangement (30) is disposed within the rotating hollow shaft (18) for sealing off the rotating hollow shaft (18) from a radially inner outlet (24) of the drain pipes (16) when respective radially inner outlet (24) is situated within a sealed zone. The non-rotating valve arrangement (30) is further arranged to, in a transition zone immediately fol- (Continued)

lowing the sealed zone, open a throttled passage between the rotating hollow shaft (18) and the radially inner outlet (24).

10 Claims, 4 Drawing Sheets

(51) Int. Cl.
    *B01D 33/64*               (2006.01)
    *B01D 33/82*               (2006.01)
    *D21C 9/06*                (2006.01)

(56) References Cited

U.S. PATENT DOCUMENTS

| | | | | |
|---|---|---|---|---|
| 770,307 A * | 9/1904 | Parker | D21F 1/60 | 162/335 |
| 819,179 A * | 5/1906 | Shortt | B01D 33/06 | 210/404 |
| 854,972 A * | 5/1907 | Wade | B01D 33/09 | 210/395 |
| 872,616 A * | 12/1907 | Fairchild | B01D 33/06 | 210/395 |
| 919,628 A * | 4/1909 | Oliver | B01D 33/466 | 210/395 |
| 994,235 A * | 6/1911 | Arbuckle | B01D 33/76 | 210/395 |
| 1,198,880 A * | 9/1916 | Wagner | B01D 33/09 | 210/395 |
| 1,208,014 A * | 12/1916 | Robinson | B01D 33/09 | 210/395 |
| 1,213,866 A * | 1/1917 | Harding | B01D 33/06 | 210/395 |
| 1,223,245 A * | 4/1917 | Biesel | B01D 33/09 | 210/395 |
| 1,253,162 A * | 1/1918 | Faber | B01D 33/09 | 210/395 |
| 1,367,946 A * | 2/1921 | Carrick | B01D 33/76 | 210/395 |
| 1,368,618 A * | 2/1921 | Faber | B01D 33/466 | 210/395 |
| 1,429,913 A * | 9/1922 | Keene | B01D 33/82 | 210/395 |
| 1,446,448 A * | 2/1923 | Brown | B01D 33/766 | 210/395 |
| 1,465,156 A * | 8/1923 | Bucher | B01D 33/09 | 210/395 |
| 1,515,130 A * | 11/1924 | Morrison | B01D 33/466 | 210/123 |
| 1,538,980 A * | 5/1925 | Genter | B01D 33/23 | 210/216 |
| 1,558,038 A * | 10/1925 | Mount | B01D 33/463 | 210/393 |
| 1,590,401 A * | 6/1926 | Wright | B01D 33/09 | 210/402 |
| 1,659,699 A * | 2/1928 | Oliver | B01D 33/09 | 210/396 |
| 1,667,465 A * | 4/1928 | Wait | B01D 33/466 | 210/791 |
| 1,686,094 A * | 10/1928 | Manning | B01D 33/044 | 210/387 |
| 1,687,863 A * | 10/1928 | Graham | B01D 33/327 | 210/395 |
| 1,705,226 A * | 3/1929 | Notz | B01D 33/742 | 210/402 |
| 1,726,942 A * | 9/1929 | Becker | B01D 33/09 | 210/542 |
| 1,774,044 A * | 8/1930 | Sweetland | B01D 33/72 | 210/780 |
| 1,775,155 A * | 9/1930 | Boykin | B01D 33/76 | 210/402 |
| 1,795,634 A * | 3/1931 | Boykin | B01D 33/09 | 210/402 |
| 1,796,491 A * | 3/1931 | Sweetland | B01D 35/16 | 210/402 |
| 1,835,796 A * | 12/1931 | McCaskell | | 210/395 |
| 1,848,054 A * | 3/1932 | Burch | C10G 73/025 | 210/395 |
| 1,859,642 A * | 5/1932 | Woodworth | B01D 33/09 | 210/395 |
| 1,861,381 A * | 5/1932 | Crocker | B01D 33/463 | 210/784 |
| 1,868,883 A * | 7/1932 | Campbell | B01D 33/06 | 210/395 |
| 1,872,209 A * | 8/1932 | Wright | B01D 33/06 | 210/395 |
| RE18,598 E * | 9/1932 | Shimmin | B01D 33/13 | 210/403 |
| 1,878,998 A * | 9/1932 | Akins | B01D 33/705 | 210/395 |
| 1,892,306 A * | 12/1932 | Hillier | B01D 33/09 | 210/395 |
| 1,904,066 A * | 4/1933 | McArthur | D06B 5/00 | 210/395 |
| 1,917,696 A * | 7/1933 | Budke | B01D 33/801 | 210/395 |
| 1,917,818 A * | 7/1933 | Woodworth | B01D 33/466 | 210/395 |
| 1,948,947 A * | 2/1934 | O'Keefe | B01D 33/09 | 210/395 |
| 1,975,230 A * | 10/1934 | Jewett | B01D 33/82 | 210/395 |
| 2,007,780 A * | 7/1935 | Wardle | B01D 29/6476 | 210/395 |
| 2,022,069 A * | 11/1935 | Whitmore | B01D 33/466 | 210/784 |
| 2,028,949 A * | 1/1936 | Fedeler, Jr. | B01D 33/74 | 210/395 |
| 2,051,079 A * | 8/1936 | Faber | B01D 45/14 | 210/395 |
| 2,073,026 A * | 3/1937 | Bond | B01D 33/23 | 210/494.2 |
| 2,081,296 A * | 5/1937 | Gard | B01D 35/16 | 159/DIG. 25 |
| 2,081,397 A * | 5/1937 | Giles | B01D 35/16 | 208/35 |
| 2,081,398 A * | 5/1937 | Giles | B01D 33/463 | 210/402 |
| 2,092,111 A * | 9/1937 | Dons | B01D 33/466 | 210/396 |
| 2,096,314 A * | 10/1937 | Barton | B01D 33/48 | 250/236 |
| 2,111,843 A * | 3/1938 | Daman | B01D 33/09 | 210/236 |
| 2,174,748 A * | 10/1939 | Hunter | B01D 33/463 | 210/395 |
| 2,186,289 A * | 1/1940 | Gee | B01D 35/16 | 251/266 |
| 2,197,610 A * | 4/1940 | Fedeler, Jr. | B01D 33/60 | 210/387 |
| 2,212,168 A * | 8/1940 | Peterson | B01D 33/06 | 210/404 |
| 2,242,861 A * | 5/1941 | Keene | B01D 33/06 | 210/485 |
| 2,259,235 A * | 10/1941 | Weiss | B01D 33/09 | 210/402 |
| 2,289,762 A * | 7/1942 | Duvall | B01D 33/09 | 210/791 |
| 2,314,110 A * | 3/1943 | Stampfel | B01D 33/46 | 210/395 |
| 2,321,230 A * | 6/1943 | Rodgers | B01D 33/06 | 210/395 |
| 2,342,380 A * | 2/1944 | Storment | B01J 8/0278 | 210/395 |
| 2,348,822 A * | 5/1944 | Kiersted, Jr. | B01D 33/466 | 210/395 |
| 2,352,304 A * | 6/1944 | Young | B01D 33/466 | 210/784 |

(56) References Cited

U.S. PATENT DOCUMENTS

| | | | | |
|---|---|---|---|---|
| 2,352,330 A * | 6/1944 | Lee | B01D 33/21 | 210/395 |
| 2,352,340 A * | 6/1944 | Oswald | B01D 33/466 | 29/896.62 |
| 2,362,300 A * | 11/1944 | Nyman | B01D 33/466 | 210/395 |
| RE22,646 E * | 5/1945 | Kiersted | B01D 33/60 | 210/771 |
| 2,379,754 A * | 7/1945 | Selensky | B01D 33/09 | 8/142 |
| 2,411,288 A * | 11/1946 | Morse | B03D 1/08 | 210/395 |
| 2,449,902 A * | 9/1948 | Kiersted, Jr. | B01D 33/466 | 210/772 |
| 2,461,824 A * | 2/1949 | Komline | B01D 33/048 | 210/401 |
| 2,489,681 A * | 11/1949 | Smith | B01D 33/82 | 210/402 |
| 2,510,254 A * | 6/1950 | Richter | B01D 33/09 | 210/402 |
| 2,525,135 A * | 10/1950 | Huff | A61J 3/06 | 162/308 |
| 2,534,161 A * | 12/1950 | Collins | B01D 33/09 | 210/402 |
| 2,547,969 A * | 4/1951 | Peterson | B01D 33/82 | 210/395 |
| 2,555,367 A * | 6/1951 | Peterson | F16K 11/074 | 210/395 |
| 2,557,440 A * | 6/1951 | Komline | B01D 33/468 | 210/401 |
| 2,582,273 A * | 1/1952 | Peterson | B01D 33/067 | 210/404 |
| 2,583,698 A * | 1/1952 | Komline | B01D 33/09 | 210/791 |
| 2,652,927 A * | 9/1953 | Komline | B01D 33/067 | 210/497.1 |
| 2,655,265 A * | 10/1953 | Little | B01D 33/463 | 210/119 |
| 2,663,432 A * | 12/1953 | Johansen | B01D 33/463 | 162/357 |
| 2,670,083 A * | 2/1954 | McKay | B01D 37/00 | 62/545 |
| 2,696,309 A * | 12/1954 | Bultman | B01D 33/09 | 162/335 |
| 2,720,315 A * | 10/1955 | Peterson | B01D 33/09 | 210/780 |
| 2,725,145 A * | 11/1955 | Mylius | B01D 33/465 | 210/402 |
| 2,737,508 A * | 3/1956 | Axe | B01D 33/466 | 210/217 |
| 2,741,369 A * | 4/1956 | Fest | B01D 33/09 | 210/392 |
| 2,755,938 A * | 7/1956 | Alcock | B01D 33/09 | 210/392 |
| 2,765,085 A * | 10/1956 | Strindlund | B01D 33/74 | 210/402 |
| 2,797,707 A * | 7/1957 | Hursh | B01D 35/00 | 210/418 |
| 2,811,259 A * | 10/1957 | Schwartz | B01D 33/19 | 210/395 |
| 2,823,806 A * | 2/1958 | Harlan | D21D 5/02 | 210/387 |
| 2,828,188 A * | 3/1958 | Felkner | B01D 33/09 | 210/402 |
| 2,889,931 A * | 6/1959 | Buttolph | C07C 7/14 | 210/395 |
| 2,899,068 A * | 8/1959 | King et al. | B01D 33/76 | 210/395 |
| 2,963,158 A * | 12/1960 | Jung | B01D 33/70 | 210/174 |
| 3,013,666 A * | 12/1961 | Krynski | B01D 33/067 | 210/402 |
| 3,014,589 A * | 12/1961 | Frykhult | B01D 33/09 | 210/123 |
| 3,015,397 A * | 1/1962 | Schwartz | B01D 33/19 | 210/395 |
| 3,027,011 A * | 3/1962 | Flynn | B01D 33/466 | 210/404 |
| 3,091,335 A * | 5/1963 | Goard | B01D 33/048 | 210/395 |
| 3,096,280 A * | 7/1963 | Davis | B01D 33/09 | 210/406 |
| 3,152,986 A * | 10/1964 | Bice | B01D 33/463 | 210/393 |
| 3,201,921 A * | 8/1965 | Heyes | B01D 53/0407 | 210/330 |
| 3,217,386 A * | 11/1965 | Clendening | D06F 39/12 | 68/3 R |
| 3,220,554 A * | 11/1965 | Schiphorst | B01D 33/82 | 210/395 |
| 3,225,935 A * | 12/1965 | Porteous | B01D 33/067 | 210/404 |
| 3,233,736 A * | 2/1966 | Vernay | B01D 33/465 | 210/406 |
| 3,235,086 A * | 2/1966 | Krynski | B01D 33/067 | 210/404 |
| 3,245,536 A * | 4/1966 | McKay | B01D 33/09 | 210/402 |
| 3,255,888 A * | 6/1966 | Balfour | B01D 33/09 | 210/395 |
| 3,262,218 A * | 7/1966 | Cymbalisty | B01F 29/61 | 210/395 |
| 3,262,575 A * | 7/1966 | Aconsky | B01D 33/463 | 210/395 |
| 3,275,155 A * | 9/1966 | Tell | D21F 1/66 | 210/404 |
| 3,306,457 A * | 2/1967 | Putnam | B01D 33/067 | 210/330 |
| 3,327,863 A * | 6/1967 | Turner, Jr. | B01D 33/073 | 210/392 |
| 3,363,774 A * | 1/1968 | Luthi | B01D 33/09 | 210/406 |
| 3,381,821 A * | 5/1968 | Hellstrom | D21D 5/26 | 210/116 |
| 3,403,786 A * | 10/1968 | Luthi | B01D 33/466 | 210/406 |
| 3,433,265 A * | 3/1969 | Bartholet | F16K 3/085 | 210/395 |
| 3,452,874 A * | 7/1969 | Keller | B01D 33/06 | 210/333.1 |
| 3,455,454 A * | 7/1969 | Sheaffer | B01D 33/82 | 210/333.1 |
| 3,471,027 A * | 10/1969 | Emilsson | B01D 33/82 | 210/395 |
| 3,485,378 A * | 12/1969 | Regel | B01D 33/11 | 210/403 |
| 3,487,941 A * | 1/1970 | Haapamaki | D21C 9/06 | 210/404 |
| 3,530,992 A * | 9/1970 | Turner, Jr. | B01D 33/073 | 210/392 |
| 3,540,597 A * | 11/1970 | Gaudfrin | B01D 29/78 | 210/333.1 |
| 3,627,139 A * | 12/1971 | Burtsev | B01D 33/09 | 210/393 |
| 3,630,380 A * | 12/1971 | Barnebl | B01D 33/09 | 210/404 |
| 3,635,341 A * | 1/1972 | Davis | B01D 33/09 | 210/396 |
| 3,638,798 A * | 2/1972 | Basfeld | B01D 33/067 | 210/404 |
| RE27,326 E * | 4/1972 | Sheaffer | B01D 33/82 | 210/91 |
| 3,659,716 A * | 5/1972 | Peterson | B01D 33/466 | 210/247 |
| 3,667,614 A * | 6/1972 | Komline | B01D 33/09 | 210/401 |
| 3,776,386 A * | 12/1973 | Richter | B01D 33/06 | 210/398 |

(56) References Cited

U.S. PATENT DOCUMENTS

| | | | | |
|---|---|---|---|---|
| 3,794,178 A * | 2/1974 | Luthi | B01D 33/067 | 210/404 |
| 3,814,259 A * | 6/1974 | Kamimura | B01D 33/09 | 210/DIG. 3 |
| 3,823,830 A * | 7/1974 | Hayafune | B01D 33/82 | 210/402 |
| 3,825,124 A * | 7/1974 | Davis | B01D 33/27 | 210/402 |
| 3,839,203 A * | 10/1974 | Jackson | B01D 33/466 | 210/104 |
| 3,846,308 A * | 11/1974 | Ahlquist | B01D 33/82 | 210/333.1 |
| 3,890,235 A * | 6/1975 | Davis | B01D 33/48 | 210/402 |
| 3,947,361 A * | 3/1976 | Jackson | B01D 33/09 | 210/402 |
| 4,001,119 A * | 1/1977 | Hunter | B01D 33/09 | 210/402 |
| 4,032,442 A * | 6/1977 | Peterson | B01D 33/23 | 210/411 |
| 4,038,187 A * | 7/1977 | Saffran | B01D 33/067 | 210/411 |
| 4,075,103 A * | 2/1978 | Kane | B01D 33/82 | 210/404 |
| 4,115,265 A * | 9/1978 | Otte | B01D 33/09 | 210/402 |
| 4,142,976 A * | 3/1979 | Browne | B01D 33/72 | 162/335 |
| 4,154,687 A * | 5/1979 | LaValley | B01D 33/067 | 210/392 |
| 4,157,301 A * | 6/1979 | Wegener | B01D 33/09 | 210/404 |
| 4,168,234 A * | 9/1979 | Hutto, Jr. | B01D 33/76 | 210/404 |
| 4,182,680 A * | 1/1980 | Carle | B01D 33/042 | 210/784 |
| 4,207,190 A * | 6/1980 | Sheaffer | B01D 33/82 | 210/232 |
| 4,255,264 A * | 3/1981 | Madsen | B01D 33/21 | 210/411 |
| 4,266,413 A * | 5/1981 | Yli-Vakkuri | D21C 9/06 | 162/380 |
| 4,276,169 A * | 6/1981 | Browne | B01D 33/09 | 210/406 |
| 4,283,285 A * | 8/1981 | Paschen | B01J 2/26 | 210/330 |
| 4,289,624 A * | 9/1981 | Golczewski | D21F 9/043 | 210/404 |
| 4,292,123 A * | 9/1981 | Lintunen | B01D 33/72 | 8/156 |
| 4,309,288 A * | 1/1982 | Ryan | B01D 33/13 | 210/395 |
| 4,333,836 A * | 6/1982 | Peroutka | D21F 1/76 | 210/404 |
| 4,346,008 A * | 8/1982 | Leighton | B01D 33/09 | 210/395 |
| 4,376,704 A * | 3/1983 | Otte | B01D 33/37 | 209/288 |
| 4,383,877 A * | 5/1983 | LaValley | B01D 33/06 | 210/402 |
| 4,407,720 A * | 10/1983 | Bratten | B01D 37/02 | 210/791 |
| 4,419,165 A * | 12/1983 | LaValley | B01D 33/06 | 210/402 |
| 4,491,501 A * | 1/1985 | Klein | D21C 9/06 | 210/402 |
| 4,502,171 A * | 3/1985 | Koskinen | D21C 9/06 | 68/184 |
| 4,505,137 A * | 3/1985 | Klein | D21C 9/06 | 68/205 R |
| 4,551,248 A * | 11/1985 | Lenac | B01D 33/09 | 210/406 |
| 4,608,170 A * | 8/1986 | LaValley | B01D 33/82 | 210/392 |
| 4,608,171 A * | 8/1986 | LaValley | B01D 33/82 | 210/392 |
| 4,680,115 A * | 7/1987 | LaValley | B01D 33/742 | 162/335 |
| 4,681,689 A * | 7/1987 | Stannard | B01D 33/72 | 210/784 |
| 4,683,059 A * | 7/1987 | LaValley | B01D 33/06 | 210/392 |
| 4,695,381 A * | 9/1987 | Ragnegard | B01D 33/808 | 210/403 |
| 4,740,305 A * | 4/1988 | Miller | D06B 5/08 | 34/115 |
| 4,764,276 A * | 8/1988 | Berry | B01D 15/1892 | 210/267 |
| 4,816,169 A * | 3/1989 | LaValley | B01D 33/073 | 210/402 |
| 4,822,488 A * | 4/1989 | Shatuck | B01D 33/82 | 210/429 |
| 4,929,355 A * | 5/1990 | Ragnegård | B01D 33/60 | 210/791 |
| 4,986,881 A * | 1/1991 | Funk | D21C 9/18 | 210/402 |
| 5,021,126 A * | 6/1991 | Gwin | D21C 9/06 | 210/402 |
| 5,046,338 A * | 9/1991 | Luthi | D21C 9/06 | 68/43 |
| 5,053,123 A * | 10/1991 | Clarke-Pounder | B01D 33/82 | 210/138 |
| 5,093,001 A * | 3/1992 | Ueda | B01D 33/66 | 210/403 |
| 5,160,434 A * | 11/1992 | Heino | B01D 33/09 | 210/402 |
| 5,194,153 A * | 3/1993 | Bardsley | B01D 33/82 | 277/362 |
| 5,264,138 A * | 11/1993 | Heino | B01D 33/466 | 210/392 |
| 5,281,343 A * | 1/1994 | Lewis | D21F 9/043 | 162/368 |
| 5,308,488 A * | 5/1994 | Nelson | B01D 33/067 | 210/406 |
| 5,470,473 A * | 11/1995 | Park | B01D 33/60 | 210/402 |
| 5,480,545 A * | 1/1996 | Lewis | B01D 33/067 | 162/368 |
| 5,503,737 A * | 4/1996 | Luthi | B01D 33/82 | 210/138 |
| 5,589,079 A * | 12/1996 | Park | B01D 33/76 | 210/791 |
| 5,620,598 A * | 4/1997 | Strid | B01D 33/82 | 210/402 |
| 5,674,396 A * | 10/1997 | Wenzl | B01D 33/463 | 210/402 |
| 5,683,582 A * | 11/1997 | Luthi | B01D 33/74 | 210/429 |
| 5,759,397 A * | 6/1998 | Larsson | B01D 37/02 | 210/402 |
| 5,914,048 A * | 6/1999 | Chase | D21D 5/046 | 210/90 |
| RE36,297 E * | 9/1999 | Heino | B01D 33/09 | 210/392 |
| 5,958,231 A * | 9/1999 | Sacherer | B01D 33/11 | 210/406 |
| 6,006,554 A * | 12/1999 | Gallagher | D21C 9/06 | 210/429 |
| 6,162,326 A * | 12/2000 | Gommel | B01D 33/21 | 162/100 |
| 6,258,282 B1 * | 7/2001 | Strid | D21F 1/66 | 210/791 |
| 6,419,835 B1 * | 7/2002 | Virtanen | B01D 33/62 | 210/791 |
| 6,500,347 B2 * | 12/2002 | Ohkoshi | B01D 37/00 | 210/791 |
| 6,906,227 B2 * | 6/2005 | Neumann | C07C 37/82 | 210/402 |

(56) References Cited

U.S. PATENT DOCUMENTS

| | | | | |
|---|---|---|---|---|
| 7,347,916 B2* | 3/2008 | Grace | B07B 1/22 | 210/402 |
| 7,575,658 B2* | 8/2009 | Grace | D21C 9/06 | 134/119 |
| 7,780,815 B2* | 8/2010 | Grace | D21C 9/18 | 162/13 |
| 7,807,060 B2* | 10/2010 | Schmid | B01D 33/044 | 210/791 |
| 7,981,248 B2* | 7/2011 | Grace | D21C 9/18 | 162/60 |
| 8,137,568 B2* | 3/2012 | Rouillard | B01D 33/067 | 210/402 |
| 8,281,936 B2* | 10/2012 | Grace | B01D 33/073 | 210/402 |
| 9,004,289 B2* | 4/2015 | Hegnauer | B01D 33/466 | 210/402 |
| 9,216,369 B2 | 12/2015 | Grim | B01D 33/067 | |
| 9,551,430 B2* | 1/2017 | Grace | B01D 33/48 | |
| 9,833,732 B2* | 12/2017 | Prader | B01D 33/466 | |
| 9,901,853 B2* | 2/2018 | Harkonen | B01D 33/09 | |
| 10,328,368 B2* | 6/2019 | Grace | B01D 33/06 | |
| 10,427,073 B2* | 10/2019 | Bitsch-Larsen | B01D 33/09 | |
| 10,857,490 B2* | 12/2020 | Bartos | B01D 33/09 | |
| 10,870,073 B2* | 12/2020 | Knobloch | B01D 33/067 | |
| 10,888,807 B2* | 1/2021 | Harden | B01D 33/41 | |
| 10,946,318 B2* | 3/2021 | Thysell | B01D 33/067 | |
| 11,633,681 B2* | 4/2023 | Grace | B01D 35/02 | 55/497 |
| 2002/0003117 A1* | 1/2002 | Ohkoshi | C07C 51/43 | 210/402 |
| 2005/0051473 A1* | 3/2005 | Suss | B01D 33/09 | 210/345 |
| 2006/0065378 A1* | 3/2006 | Grace | D21C 9/06 | 134/119 |
| 2007/0170108 A1* | 7/2007 | Rouillard | B01D 33/067 | 210/404 |
| 2008/0061011 A1* | 3/2008 | Schmid | B01D 33/044 | 210/769 |
| 2008/0087391 A1* | 4/2008 | Grace | B30B 9/20 | 162/13 |
| 2008/0087392 A1* | 4/2008 | Grace | D21C 9/06 | 162/53 |
| 2008/0156747 A1* | 7/2008 | Grace | B01D 33/073 | 210/404 |
| 2010/0213142 A1* | 8/2010 | Andersson | B01D 33/466 | 210/393 |
| 2010/0314062 A1* | 12/2010 | Grace | B30B 9/20 | 162/217 |
| 2011/0031193 A1* | 2/2011 | Ekberg | B01D 33/466 | 210/784 |
| 2012/0152863 A1* | 6/2012 | Ekberg | B01D 39/2027 | 210/85 |
| 2012/0160748 A1* | 6/2012 | Grim | B01D 33/067 | 210/402 |
| 2012/0160761 A1* | 6/2012 | Hegnauer | B01D 33/58 | 210/402 |
| 2012/0273432 A1* | 11/2012 | Peuker | B01D 33/073 | 210/741 |
| 2013/0118991 A1* | 5/2013 | Lekscha | B01D 33/804 | 210/744 |
| 2014/0353260 A1* | 12/2014 | Harkonen | B01D 33/09 | 210/770 |
| 2015/0101974 A1* | 4/2015 | Prader | B01D 36/001 | 210/324 |
| 2015/0292639 A1* | 10/2015 | Grace | D21C 9/06 | 210/402 |
| 2017/0087493 A1* | 3/2017 | Grace | D21C 9/06 | |
| 2018/0207558 A1* | 7/2018 | Bitsch-Larsen | B01D 33/801 | |
| 2018/0207559 A1* | 7/2018 | Bartos | B01D 33/09 | |
| 2019/0224597 A1* | 7/2019 | Harden | B01D 33/39 | |
| 2019/0388809 A1* | 12/2019 | Rawls | B01D 33/067 | |
| 2020/0246733 A1* | 8/2020 | Grace | B01D 33/067 | |
| 2021/0129059 A1* | 5/2021 | Harden | B01D 33/50 | |
| 2021/0246096 A1* | 8/2021 | Keyes | B01D 33/09 | |
| 2021/0252436 A1* | 8/2021 | Sundström | B01D 33/067 | |
| 2021/0268410 A1* | 9/2021 | Townson | B01D 33/067 | |
| 2021/0387116 A1* | 12/2021 | Maurer | B01D 33/663 | |
| 2022/0047974 A1* | 2/2022 | Schäfer | B01D 33/722 | |
| 2023/0302384 A1* | 9/2023 | Rawls | B01D 33/09 | |
| 2023/0338880 A1* | 10/2023 | Harden | B01D 33/41 | |

FOREIGN PATENT DOCUMENTS

| | | | | |
|---|---|---|---|---|
| WO | WO-99/15255 A1 | 4/1999 | | |
| WO | WO 2013/087977 A1 | 6/2013 | | |
| WO | WO 2014/188068 A1 | 11/2014 | | |
| WO | WO-2019245422 A1 * | 12/2019 | | B01D 33/067 |

OTHER PUBLICATIONS

Office Action issued in connection with Indian Appl. No. 202017047633 dated Dec. 8, 2023.

* cited by examiner

ROTARY DRUM VACUUM FILTER WITH A THROTTLING VALVE

TECHNICAL FIELD

The present invention relates in general to washing and filtering equipment and in particular to arrangements in connection with pulp filters.

BACKGROUND

In a pulp production, fibers are typically treated in different steps with different liquors. Within the process, different used liquors or unwanted products have to be removed from the pulp at different stages. It is thus common to use different kinds of washing equipment, typically in connection with different kinds of filters.

One well-known type of pulp filter is a drum vacuum filter. Such a filter comprises a rotatable drum mounted in a vat provided with pulp suspension. The outer surface of the drum is perforated and allows penetration of liquids. A "vacuum", or at least an underpressure, is applied on the inside of the outer surface of the drum, causing a suction of liquid through the outer surface. This causes pulp to settle onto the outer surface. When the drum is rotated, the pulp cake will follow the drum up from the vat and the water content in the pulp cake is reduced by further suction of liquids through the outer surface. Different washing steps can also be provide here.

When the pulp cake is as dry as requested, it is removed from the drum. In order to facilitate this removal, the vacuum is no longer applied during that stage. This is arranged for by a cylindrical valve. In other words, in a vacuum filter with a cylindrical valve, there are in general two zones. One zone where the "vacuum" is applied over the pulp web and drain the pulp web and one zone without vacuum for enabling the release of the pulp web. The zones are defined by the cylindrical valve.

A problem with this setup is that the cylindrical valve is designed so that the transition from non-vacuum to "full vacuum" occurs fast, which leads to that fibers may densely fill up the closest layer on the drum surface. This is particularly common for short fiber pulp. The pulp web then becomes dense, which deteriorate the dewatering and the release of the pulp web, which in turn deteriorate the washing.

SUMMARY

A general object is to improve the density distribution in the pulp web in a pulp-filter arrangement.

The above object is achieved by methods and devices according to the independent claims. Preferred embodiments are defined in dependent claims.

In general words, in a first aspect, a pulp-filter arrangement comprises a rotatable drum enclosed by a non-rotating casing and a non-rotating valve arrangement. The rotatable drum has a cylindrical water-permeable pulp-supporting shell, a plurality of drain pipes and a rotating hollow shaft. The plurality of drain pipes connects the rotating hollow shaft with a collecting channel. The collecting channel is situated radially directly inside the cylindrical water-permeable pulp-supporting shell, thereby enabling a drain of liquid, passing radially inwards through the cylindrical water-permeable pulp-supporting shell, through the rotating hollow shaft. The non-rotating valve arrangement is disposed within the rotating hollow shaft. The non-rotating valve arrangement is arranged for sealing off the hollow part of the rotating hollow shaft from a radially inner outlet of the plurality of drain pipes when respective radially inner outlet during rotation of the rotatable drum in a rotation direction is situated within a sealed zone. The non-rotating valve arrangement is further arranged to, in a transition zone immediately following the sealed zone in the rotation direction, open a throttled passage between the rotating hollow shaft and the radially inner outlet of the plurality of drain pipes. The throttled passage is narrower than a fully open passage between said rotating hollow shaft (18) and said radially inner outlet (24).

One advantage with the slower application of vacuum provided in the proposed technology is that the dewatering and the release is improved. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

For a better understanding of the proposed technology, it may be useful to begin with a brief overview of a vacuum filter in general.

Figure 1:
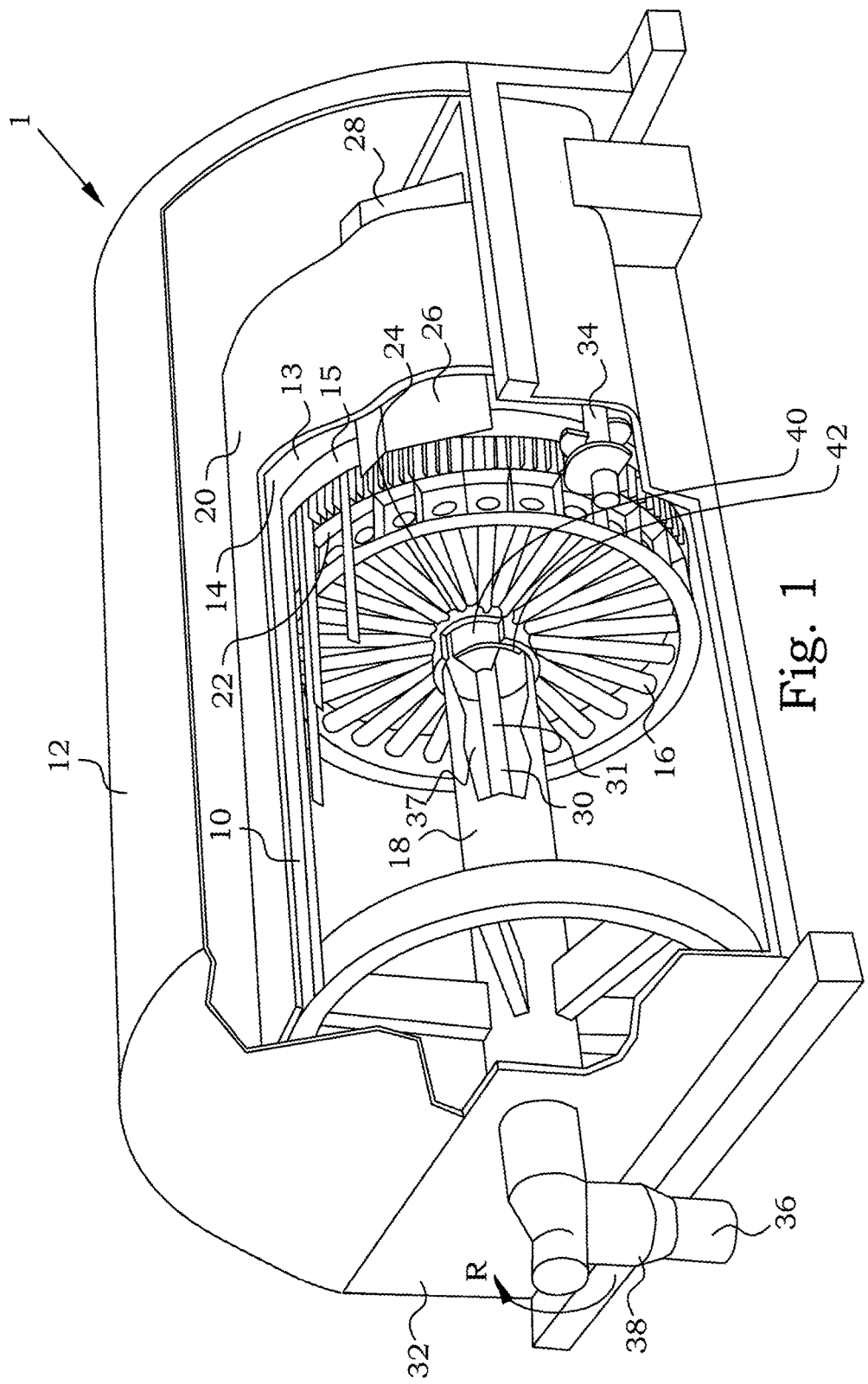
FIG. 1 schematically illustrates an embodiment of a vacuum filter in an elevational view.

FIG. 1 shows an embodiment of a vacuum filter in an elevational view. Some parts are broken away to allow illustration of the inner parts of the pulp-filter arrangement 1. The pulp-filter arrangement 1 comprises a rotatable drum 10 enclosed by a non-rotating casing 12. The rotatable drum 10 has a pulp-supporting shell 14, a plurality of drain pipes 16 and a rotating hollow shaft 18. The pulp-supporting shell 14 is cylindrical and water-permeable. In this particular embodiment, the pulp-supporting shell 14 comprises a mantle decking 13 and a filter wire 15.

The drain pipes 18 connect the rotating hollow shaft 18 with a collecting channel 22. The collecting channels 22 are situated radially directly inside the pulp-supporting shell 14. The collecting channels 22 thereby enable a drain of liquid, passing radially inwards through the pulp-supporting shell 14. The liquid is drained through the rotating hollow shaft 18.

An underpressure-providing arrangement 38, constituted by a drop leg 36, is arranged to provide an underpressure within a hollow part 37 of the rotating hollow shaft 18. The drop leg 36 is thus connected to the rotating hollow shaft 18. Alternatively, the underpressure-providing arrangement 38 may comprise any type of pump.

As will be discussed further below, pulp suspension is provided in a vat 32, surrounding the lower part of the rotatable drum 10. The underpressure of the hollow part 37 of the rotating hollow shaft 18 is provided to the collecting channel 22 via the drain pipes 16, resulting in that liquids from the pulp suspension is drawn through the pulp-supporting shell 14. This causes pulp to settle against the pulp-supporting shell 14, starting to build up a pulp web 20. When a portion of the pulp-supporting shell 14, upon rotation of the rotatable drum 10 in a rotation direction R, leaves the vat 32, the pulp-supporting shell 14 is covered by a pulp web 20.

In the upper part of the pulp-filter arrangement 1, different washing steps can be implemented. In order to simplify the understanding of the basic process, such arrangements are omitted in FIG. 1.

When the pulp web 20 is drained from unnecessary liquids, the pulp web 20 is removed from the pulp-supporting shell 14 by a take-off device 28 comprising e.g. a doctor table 26. The removed and possibly cut pulp web is transported out from the pulp-filter arrangement 1 by a screw conveyor 34. The removal of the pulp web is facilitated by providing a vacuum free zone or a sealed zone at the sectors where the removal is performed.

To this end, the pulp-filter arrangement 1 further comprises a non-rotating valve arrangement 30 disposed within the rotating hollow shaft 18. The non-rotating valve arrangement 30 comprises a valve shaft 31 parallel to the rotating hollow shaft 18. The non-rotating valve arrangement 30 is arranged for sealing off the hollow part 37 of the rotating hollow shaft 18 from a radially inner outlet 24 of the drain pipes 16. This sealing off is provided when respective radially inner outlet 24, during rotation of the rotatable drum 10 in the rotation direction R, is situated within a sealed zone. The sealed zone will be discussed more in detailed below.

The non-rotating valve arrangement 30 comprises a sealing plate 40 positioned against an inner surface 17 of the rotating hollow shaft 18 at the radially inner outlets 24 of the drain pipes 16 in the sealed zone. The sealing plate 40 has a shape of a part of a cylinder with an outer radius equal to an inner radius of the rotating hollow shaft 18. In this embodiment, the valve shaft 31 supports the sealing plate 40.

By configuring the non-rotating valve arrangement 30 in such a way that the vacuum is not fully applied at once when the drain pipes 16 leaves the sealed zone, the fibers from the pulp suspension will be placed on the pulp-supporting shell 14 of the rotating drum 10 in a less dense manner. When the "full vacuum" is applied, a pressure drop over the existing pulp web 20 will counteract the formation of a dense pulp web 20 in the continued process. The careful opening in the non-rotating valve arrangement 30 can be realized e.g. by slits, holes or oblique cutting, as will be further discussed below.

In order to provide the careful opening the non-rotating valve arrangement 30 is further arranged to open a throttled passage between the rotating hollow shaft 18 and the radially inner outlet 24 of said drain pipes 16. The throttled passage is narrower than a fully open passage between the rotating hollow shaft 18 and the radially inner outlet 24. This careful opening takes place in a transition zone immediately following the sealed zone in the rotation direction R.

Preferably, the non-rotating valve arrangement 30 is arranged to gradually open the throttled passage when the rotatable drum 10 rotates in the rotation direction R.

In this embodiment, the non-rotating valve arrangement 30 comprises a valve plate 42 positioned against the inner surface of the rotating hollow shaft 18 at the radially inner outlet 24 of the drain pipes 16 in the transition zone. The valve plate 42 has a shape of a part of a cylinder with an outer radius equal to an inner radius of the rotating hollow shaft 18. The valve plate 42 presents at least one opening with an opening area that is smaller than a fully open passage.

Preferably, the least one opening 60 has an opening area that averaged over a width of the radially inner outlet 24 of the drain pipes 16 gradually increases in the rotation direction R. In this embodiment, the valve shaft 31 also supports the valve plate 42.

Figure 2:
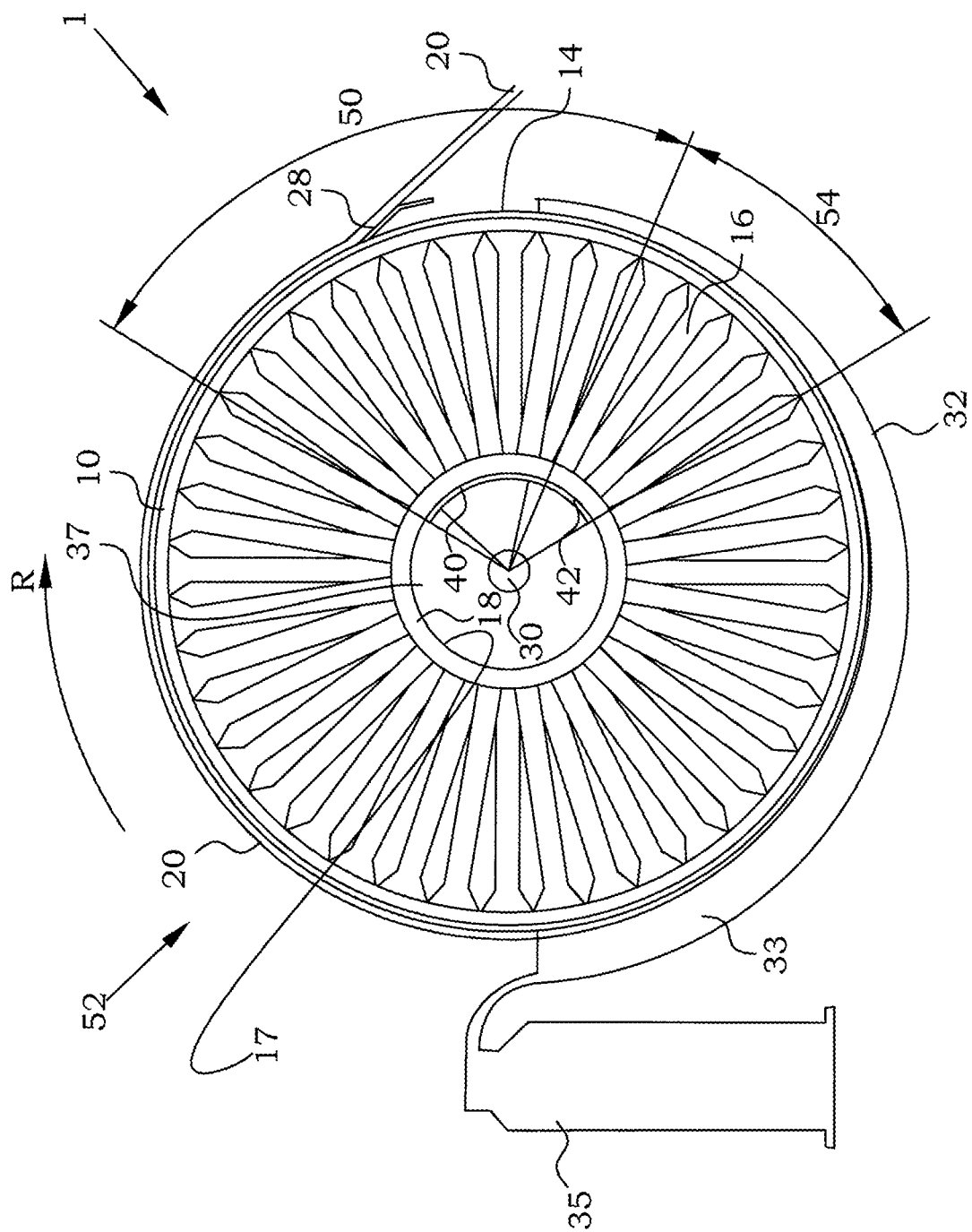
FIG. 2 schematically illustrate a cross-sectional view of an embodiment of a vacuum filter.

FIG. 2 illustrates an embodiment of a vacuum filter in a cross-sectional view. A pulp source 35 provides pulp suspension 33 into the vat 32. Upon rotation of the rotatable drum 10 in the rotation direction R, pulp will settle on the pulp-supporting shell, forming the pulp web 20. This action is supported by the vacuum provided by the rotating hollow shaft 18 and the drain pipes 16. The vacuum is applied in an open zone 52. When the pulp web leaves the pulp suspension 33 in the vat, the pulp web 20 does not grow in thickness any more, but instead the vacuum can be utilized to remove parts of the liquids of the pulp. Furthermore, different washing steps (not illustrated) can be applied within the open zone 52. These washing steps are preferably performed according to well-known prior art and are not influencing the main topics of the presently presented ideas. Therefore, such additional operations and arrangements are not further discussed in order to simplify the description.

When a portion of the pulp web 20 is ready to be removed, a corresponding part of the rotatable drum 10 enters into the sealed zone 50. In this sealed zone 50, the non-rotating valve arrangement 30 is arranged for sealing off the hollow part 37 of the rotating hollow shaft 18 from the radially inner outlet of the drain pipes 16. This sealing off is provided when respective radially inner outlet, during rotation of the rotatable drum 10 in the rotation direction R, is situated within the sealed zone 50. In this embodiment, the sealing off is performed by the sealing plate 40, sealing against the inner surface 17 of the rotating hollow shaft 18. The take-off device 28 removes the pulp web 20 and the bare pulp-supporting shell 14 can once again be brought down in the pulp suspension 33 of the vat 32.

When the vacuum once more is applied to the inside of the pulp supporting shell 14, this is performed gradually within the transition zone 54, in order to avoid a too dense pulp web closest to the pulp-supporting shell 14. In the transition zone 54, a passage is gradually opened between the rotating hollow shaft 18 and the radially inner outlet of the drain pipes 16 when the rotatable drum 10 rotates in the rotation direction R. The transition zone 54 is situated immediately after the sealed zone 50 in the rotation direction R. The valve plate 42 is in this embodiment positioned against the inner surface 17 of the rotating hollow shaft 18.

Figure 3:
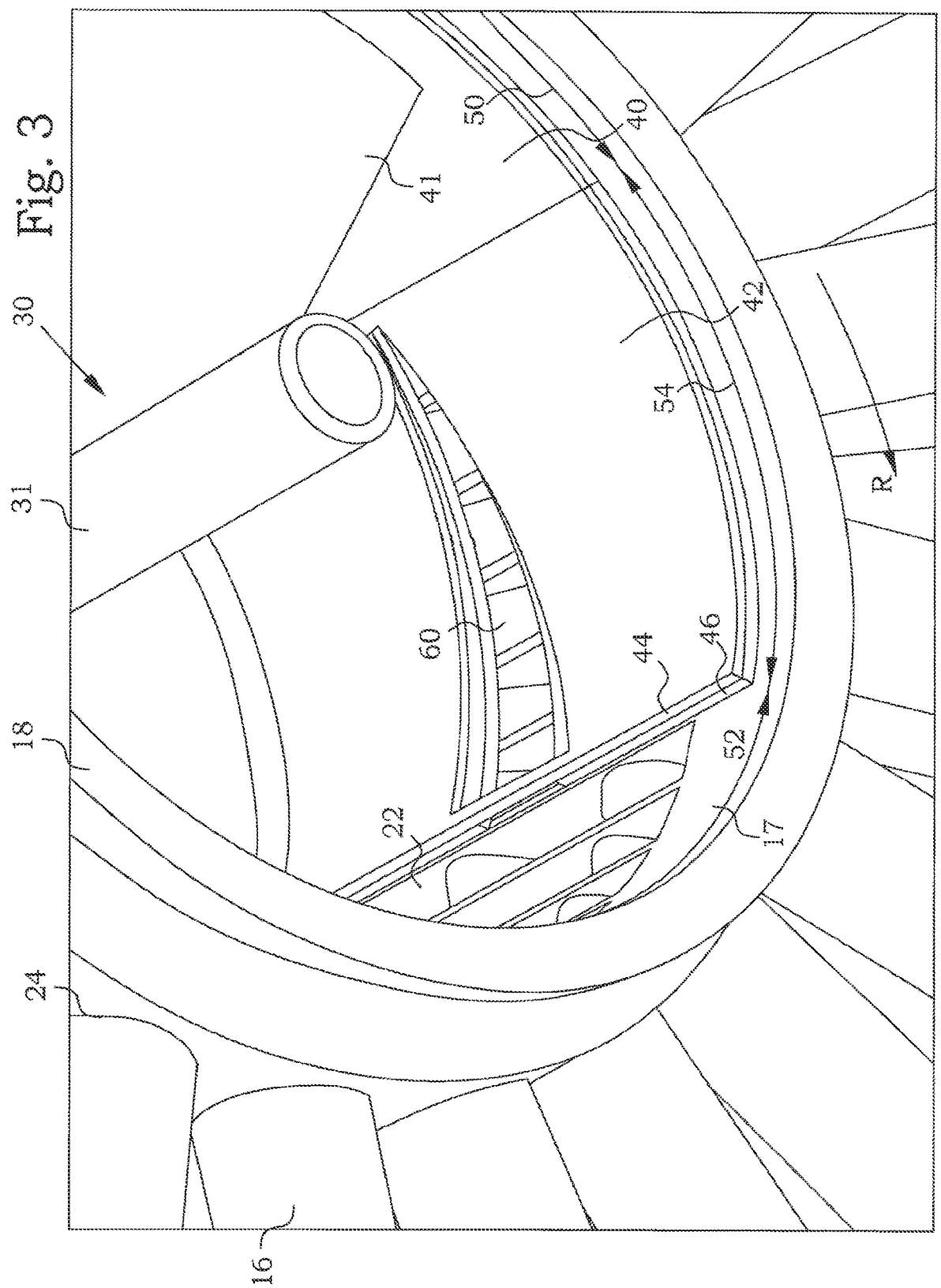
FIG. 3 schematically illustrate an embodiment of a non-rotating valve arrangement in a vacuum filter.

A close-up view of an embodiment of the non-rotating valve arrangement 30 and the parts cooperating therewith is illustrated in FIG. 3. A valve support 41 mechanically connects the valve shaft 31 of the non-rotating valve arrangement 30 with the sealing plate 40 and the valve plate 42. In this embodiment, the valve plate 42 presents an opening 60, which gradually widens in the rotational direction R. In this particular embodiment, the valve 10 plate 42 presents a V-shaped opening.

Also, in the embodiment of FIG. 3, the sealing plate 40 and the valve plate 42 are built-up in a two-layer configuration, having a radially outer layer of a sealing material 46 provided in a close vicinity of the inner surface 17 of the rotating hollow shaft 18, however, typically with a very small slit therebetween.

This radially outer layer of a sealing material 46 is supported by a radially inner rigid layer 44. This configuration can alternatively also be provided just to one of the sealing plate 40 and the valve plate 42. It is preferably if the transition zone 54 covers at least two, more preferably at least four, and most preferably at least six of the radially inner outlets of the plurality of drain pipes 16 at a time. In this particular embodiment, the transition zone 54 covers six of the radially inner outlets of the plurality of drain pipes 16 at a time.

The valve plate 42 can be configured in many different ways. Common for the preferred embodiments is that an average total area, e.g. averaged over the width of a drain pipe, of the holes through the valve plate 42 gradually increases in the rotational direction. This gradual increase may be continuous or discrete.

Figure 4:
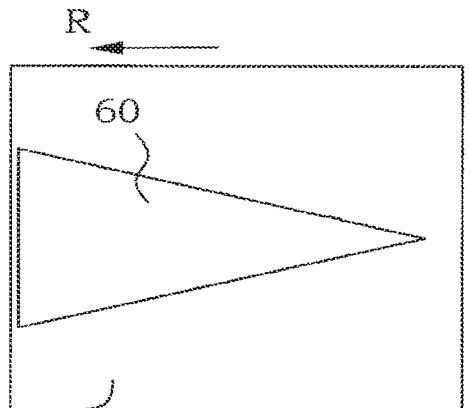
FIG. 4 schematically illustrates a top view of an embodiment of a valve plate of a non-rotating valve arrangement in a vacuum filter.

In FIG. 4, a top view of an embodiment of a valve plate 42 of a non-rotating valve arrangement 30 in a vacuum filter is schematically illustrated. This design is essentially the same as shown in FIG. 2, where the opening 60 is a V-shaped opening.

Figure 5:
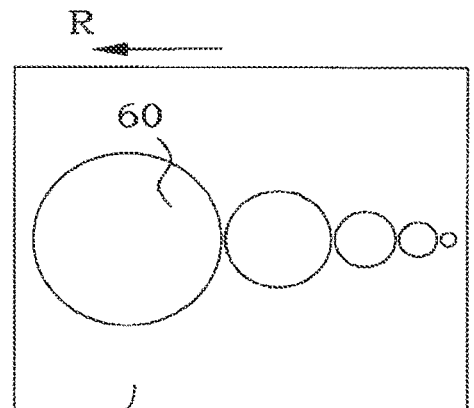
FIG. 5 schematically illustrates a top view of another embodiment of a valve plate of a non-rotating valve arrangement in a vacuum filter.

In FIG. 5, a top view of another embodiment of a valve plate 42 of a non-rotating valve arrangement 30 in a vacuum filter is schematically illustrated. This embodiment presents a series of holes with increasing area. In other words, valve plate 42 presents holes, wherein an average total area of the holes increases in the rotation direction.

Figure 6:
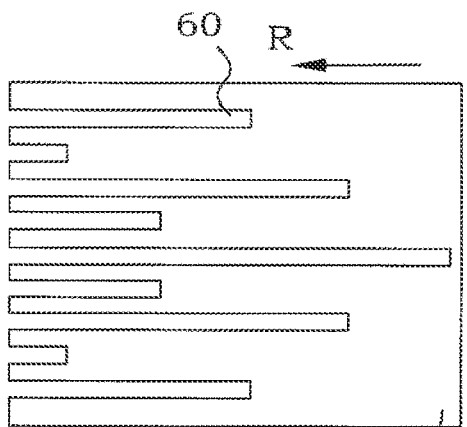
FIG. 6 schematically illustrates a top view of yet another embodiment of a valve plate of a non-rotating valve arrangement in a vacuum filter.

In FIG. 6, a top view of yet another embodiment of a valve plate 42 of a nonrotating valve arrangement 30 in a vacuum filter is schematically illustrated. This embodiment presents a number of slits with different lengths along the rotation direction R. In other words, the valve plate 42 presents slits, an average total area of the slits increases in the rotation direction R.

Figure 7:
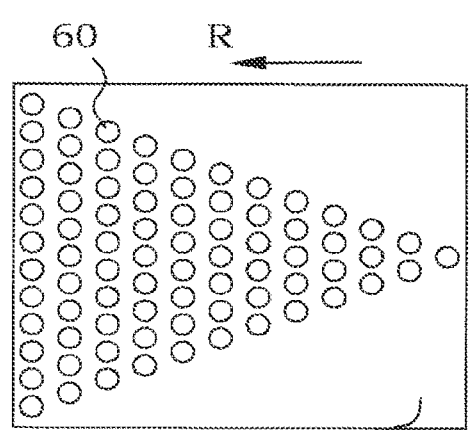
FIG. 7 schematically illustrates a top view of yet another embodiment of a valve plate of a non-rotating valve arrangement in a vacuum filter.

In FIG. 7, a top view of yet another embodiment of a valve plate 42 of a nonrotating valve arrangement 30 in a vacuum filter is schematically illustrated. This embodiment also presents a number of holes, but with the same area. Instead, the number of holes increases in the direction along the rotation direction R, giving rise to a gradually increasing average total area.

Figure 8:
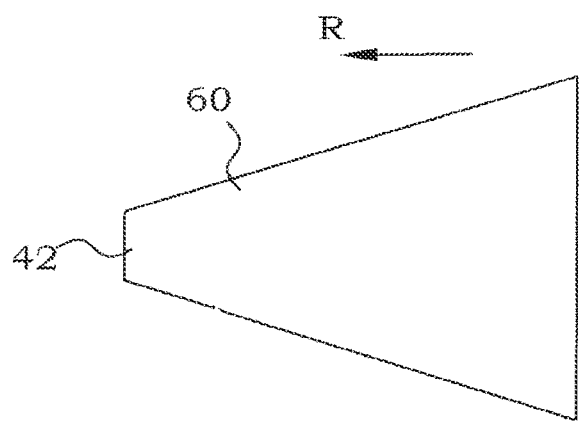
FIG. 8 schematically illustrates a top view of yet another embodiment of a valve plate of a non-rotating valve arrangement in a vacuum filter.

In FIG. 8, a top view of yet another embodiment of a valve plate 42 of a nonrotating valve arrangement 30 in a vacuum filter is schematically illustrated. This embodiment presents oblique cuts. In other words, the valve plate 42 presents oblique cuts. An average total area of the valve plate 42 that is removed by the oblique cuts increases in the rotation direction.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A rotary pulp filter drum assembly comprising:
   a fixed casing (12);
   a rotatable drum (10) disposed within the fixed casing (12), the rotatable drum comprising:
      a cylindrical water permeable pulp-supporting shell (14),
      a rotating hollow shaft (18),
      a collecting channel (22) disposed within the cylindrical water permeable pulp-supporting shell (14) for receiving liquid draining through the cylindrical water permeable pulp-supporting shell (14), and
      a plurality of radial drain pipes (16), each of the plurality of radial drain pipes having an inlet in fluid communication with the collecting channel (22) and a radially inner outlet (24) for delivering liquid drainage to an interior of the rotating hollow shaft (18); and
   a non-rotating valve arrangement (30) disposed within the rotating hollow shaft (18) and the fixed casing (12), the non-rotating valve arrangement capable of controlling liquid drainage flow through the plurality of radial drain pipes, the non-rotating valve arrangement comprising:
      a sealing plate for sealing off a hollow part (37) of the rotating hollow shaft (18) from the radially inner outlet (24) of each of the plurality of radial drain pipes (16) when the radially inner outlet (24) is situated within a sealed zone (50) during rotation of the rotatable drum (10) in a rotation direction R,
      a valve plate (42) having an opening (60) that is capable of receiving the liquid drainage flow from each of the plurality of radial drain pipes (16) when each respective radially inner outlet (24) is situated within a transition zone (54) during rotation of the rotatable drum (10) in the rotation direction R, and
      a valve shaft (31) longitudinally extending through the rotating hollow shaft (18) and supporting the sealing plate (40) and the valve plate (42);
   wherein the non-rotating valve arrangement is arranged to gradually open the opening when the rotatable drum rotates in the rotation direction R; and
   wherein, rotation of the rotatable drum in the rotation direction R moves the radially inner outlet (24) of each of the plurality of radial drain pipes about the non-rotating valve arrangement, successively exposing the radially inner outlet of each of the plurality of radial drain pipes to the sealed zone where no liquid drainage flow takes place, the transition zone where some liquid drainage flow takes place, and an open zone (52) where maximum liquid drainage flow takes place, the open zone being between the transition zone the sealed zone.

2. The rotary pulp filter drum assembly of claim 1, wherein the opening has a size which gradually increases in the rotation direction R.

3. The rotary pulp filter drum assembly of claim 1, wherein the opening is V-shaped.

4. The rotary pulp filter drum assembly of claim 1, wherein:
   the opening comprises a plurality of holes; and
   an average total area of the plurality of holes increases in the rotation direction R.

5. The rotary pulp filter drum assembly of claim 1, wherein:
   the opening comprises a plurality of slits; and an average total area of the plurality of slits increases in the rotation direction R.

6. The rotary pulp filter drum assembly of claim 1, wherein:
the opening comprises a plurality of oblique cuts; and
an average total area of the valve plate removed by the plurality of oblique cuts increases in the rotation direction R.

7. The rotary pulp filter drum assembly of claim 1, wherein the valve shaft is parallel to the rotating hollow shaft.

8. The rotary pulp filter drum assembly of claim 1, wherein the transition zone covers the radially inner outlet of two of the plurality of radial drain pipes at a time.

9. The rotary pulp filter drum assembly of claim 8, wherein the transition zone covers the radially inner outlet of four of the plurality of radial drain pipes at a time.

10. The rotary pulp filter drum assembly of claim 8, wherein the transition zone covers the radially inner outlet of six of the plurality of radial drain pipes at a time.

* * * * *